United States Patent
Song et al.

(10) Patent No.: US 11,327,028 B2
(45) Date of Patent: May 10, 2022

(54) CERAMIC BALL AUTOMATIC SORTING SYSTEM AND METHOD

(71) Applicant: Sinoma Advanced Nitride Ceramics Co., Ltd., Zibo (CN)

(72) Inventors: Jian Song, Zibo (CN); Feng Sun, Zibo (CN); Weiru Zhang, Zibo (CN); Tingxia Dong, Zibo (CN); Xuemin Xu, Zibo (CN); Baocun Zhang, Zibo (CN); Shangjin Si, Zibo (CN)

(73) Assignee: SINOMA ADVANCED NITRIDE CERAMICS CO., LTD., Zibo (CN)

( * ) Notice: Subject to any disclaimer, the term of this patent is extended or adjusted under 35 U.S.C. 154(b) by 0 days.

(21) Appl. No.: 16/479,019

(22) PCT Filed: Sep. 10, 2018

(86) PCT No.: PCT/CN2018/104787
§ 371 (c)(1),
(2) Date: Jul. 18, 2019

(87) PCT Pub. No.: WO2020/051728
PCT Pub. Date: Mar. 19, 2020

(65) Prior Publication Data
US 2021/0187556 A1    Jun. 24, 2021

(51) Int. Cl.
*G01N 21/95* (2006.01)
*B07C 5/342* (2006.01)
(Continued)

(52) U.S. Cl.
CPC ............ *G01N 21/951* (2013.01); *B07C 5/342* (2013.01); *B25J 9/1697* (2013.01); *G05B 19/4155* (2013.01); *G05B 2219/40269* (2013.01)

(58) Field of Classification Search
USPC ........................................................ 700/223
See application file for complete search history.

(56) References Cited

U.S. PATENT DOCUMENTS

2001/0012389 A1* 8/2001 Welchman ........... G01N 21/951
382/141

FOREIGN PATENT DOCUMENTS

| CN | 103990603 A | * | 8/2014 |
| CN | 204523609 U | * | 8/2015 |
| JP | 2009128230 A | * | 6/2009 |

OTHER PUBLICATIONS

Tiebin Yang, Liqin Wang, Dezhi Zheng and Le Gu, "Image Acquisition and Segmentation for Ceramic Bearing Ball Surface Inspection System," 2006 6th World Congress on Intelligent Control and Automation, 2006, pp. 8444-8447, doi: 10.1109/WCICA.2006.1713625. (Year: 2006).*

* cited by examiner

*Primary Examiner* — Mohammad Ali
*Assistant Examiner* — Joshua T Sanders
(74) *Attorney, Agent, or Firm* — IP Attorneys Group, LLC

(57) ABSTRACT

The present invention discloses a ceramic ball automatic sorting system and method. The system automatically sucks a ceramic ball on a ceramic ball feeding track for image acquisition, identifies whether the ceramic ball is defective according to the acquired image information, and determines a ball storage device into which the ceramic ball is placed, and the whole process does not require manual participation, which achieves the automation of ceramic ball defect identification and sorting and improves the ceramic ball defect identification accuracy and sorting efficiency. According to the method, images of the ball surface shot at each angle are automatically spliced by using an automatic (Continued)

image splicing technology to achieve full coverage. A defect is identified by using a threshold segmentation algorithm according to a set threshold, and whether the ceramic ball is defective and the ball storage device where the ceramic ball should be placed are determined, thereby achieving the automation of ceramic ball defect identification and sorting, and improving the ceramic ball defect identification accuracy and sorting efficiency.

9 Claims, 3 Drawing Sheets

(51) Int. Cl.
    *B25J 9/16*     (2006.01)
    *G05B 19/4155*     (2006.01)

CERAMIC BALL AUTOMATIC SORTING SYSTEM AND METHOD

TECHNICAL FIELD

The present invention relates to the technical field of surface quality inspection of bearing rolling elements, and in particular to a ceramic ball automatic sorting system and method.

BACKGROUND

With the rapid development of the industry, the requirements for ceramic ball bearings are getting higher and higher. The ceramic ball is the most important rotary part in various bearings. According to the statistics, 90% of bearing damage is the damage of the rotary parts, especially caused by the appearance quality problems, such as ceramic balls with surface defects such as pits and pores. Under high temperature and high pressure, such ceramic balls are the first to be locally damaged and damaged. In the production, finished balls must be subjected to surface defect inspection, and the balls with the appearance quality problems should be all removed. A conventional detection method is to magnify the ceramic ball 20 times under a microscope, and then compare the magnified image with the standard visual inspection. This manual detection method has low automation degree and high false detection and missing detection rate, and it is difficult to improve the production efficiency. As a result, ceramic ball defect control and automatic identification selection, which have the greatest impact on bearing failure, have become a key technical issue of great concern. There is an urgent need in the art for ceramic ball automatic detection apparatuses to correctly and efficiently perform ceramic ball surface defect inspection. This requires a large number of ceramic ball appearance detection devices with moderate prices and high sensitivity and accuracy, but there are no application examples for such devices. Since only the manual sorting has been used before and an automatic identification and sorting device is still in the research stage, those skilled in the art are in urgent need of a ceramic ball automatic sorting system and method for automating ceramic ball defect identification and sorting.

SUMMARY

Against the technical problem to be solved by the present invention, a ceramic ball automatic sorting system and method are provided, to achieve the automation of ceramic ball defect identification and sorting, and improve the ceramic ball defect identification accuracy and sorting efficiency.

To resolve the above problem, the present invention provides a ceramic ball automatic sorting system and method.

The ceramic ball automatic sorting system includes a computer, and a ceramic ball feeding track, a robot arm, an image acquisition device, a ceramic ball clamping and overturning device and a ball storage device which are respectively connected with the computer; where the computer controls the robot arm to be positioned at a position for sucking a ceramic ball, so as to suck a ceramic ball on the ceramic ball feeding track and transfer the ceramic ball to an acquisition area of the image acquisition device for image acquisition;

the image acquisition device acquires an image of the ceramic ball, and sends the acquired image information to the computer in real time;

the computer controls the robot arm to transfer the ceramic ball to the ceramic ball clamping and overturning device for 90-degree lengthwise overturning, performs image acquisition on the overturned ceramic ball, and sends the acquired image information to the computer in real time; and the computer identifies the ball storage device into which the ceramic ball is placed according to the image information acquired by the image acquisition device, and sends a control command to control the robot arm to place the ceramic ball into the ball storage device to achieve automatic sorting of the ceramic ball.

Optionally, the ceramic ball feeding track includes a ceramic ball automatic positioning device, and the ceramic ball feeding track is connected with the computer through the ceramic ball automatic positioning device; and the ceramic ball feeding track is inclined, and the ceramic ball rolls from a high point to a low point of the inclined ceramic ball feeding track.

Optionally, the robot arm is connected with a vacuum air source, and the robot arm sucks the ceramic ball through the connected vacuum air source; the ceramic ball is connected with a rotating motor, the rotating motor drives the robot arm to rotate axially, and the angle of the axial rotation is in the range of 120 degrees.

Optionally, the image acquisition device includes a pneumatic slider, a camera fixed to the pneumatic slider, a camera position control system connected with the pneumatic slider and a position sensor; and the image acquisition device is connected with the computer through the camera position control system.

Optionally, the ball storage device includes a device for storing defective ceramic balls and a device for storing qualified ceramic balls; the device for storing defective ceramic balls and the device for storing qualified ceramic balls are fixed in position, and the computer controls the robot arm to place the ceramic ball in the corresponding ball storage device according to the positions of the device for storing defective ceramic balls and the device for storing qualified ceramic balls.

The ceramic ball automatic sorting method includes:

obtaining a diameter D of a ceramic ball, and calculating a parallel distance L between a highest point of the ceramic ball and an end point of a ceramic ball feeding track according to the diameter D of the ceramic ball;

controlling a robot arm to suck the ceramic ball at a position which is at the parallel distance of L from the end point of the ceramic ball feeding track;

controlling the robot arm to move the ceramic ball to an acquisition area of an image acquisition device;

calculating a horizontal distance S between an acquisition lens of the image acquisition device and the center of the ceramic ball according to the diameter D of the ceramic ball;

controlling the image acquisition device to acquire a first image of the ceramic ball at a position where a horizontal distance between the acquisition lens of the image acquisition device and the center of the ceramic ball is S;

controlling the robot arm to move the ceramic ball to a ceramic ball clamping and overturning device to overturn the ceramic ball lengthwise by 90°, and moving the overturned ceramic ball to the acquisition area of the image acquisition device;

controlling the image acquisition device to acquire a second image of the ceramic ball at a position where the horizontal distance between the acquisition lens of the image acquisition device and the center of the ceramic ball is S;

splicing the first image of the ceramic ball and the second image of the ceramic ball to obtain a full coverage image of the ceramic ball;

identifying a defect in the full coverage image of the ceramic ball by using a threshold segmentation algorithm according to a set image feature value threshold and a defect threshold, to obtain an identification result;

when the identification result indicates that the ceramic ball is defective, controlling the robot arm to place the ceramic ball in the device for storing defective ceramic balls; and when the identification result indicates that the ceramic ball is qualified, controlling the robot arm to place the ceramic ball in the device for storing qualified ceramic balls.

Optionally, the obtaining a diameter D of a ceramic ball, and calculating a parallel distance L between a highest point of the ceramic ball and an end point of a ceramic ball feeding track according to the diameter D of the ceramic ball specifically includes:

calculating a parallel distance L between the highest point of the ceramic ball and the end point of the ceramic ball feeding track according to a formula $L=D/2$.

Optionally, the calculating a horizontal distance S between the front of the image acquisition device and the center of the ceramic ball according to the diameter D of the ceramic ball specifically includes:

calculating the horizontal distance S between the acquisition lens of the image acquisition device and the center of the ceramic ball according to a formula $S=D/2 \sin 12°$.

Optionally, the splicing the first image of the ceramic ball and the second image of the ceramic ball to obtain a full coverage image of the ceramic ball specifically includes:

splicing the first image of the ceramic ball to obtain a spliced first image; where the first image includes three images shot by continuously overturning the ceramic ball crosswise by 120° three times;

splicing the second image of the ceramic ball to obtain a spliced second image; where the second image includes three images shot by overturning the ceramic ball lengthwise by 90° and then continuously overturning the ceramic ball crosswise by 120° three times; and splicing the spliced first image and the spliced second image to obtain a full coverage image of the ceramic ball.

Optionally, the identifying a defect in the full coverage image of the ceramic ball by using a threshold segmentation algorithm according to a set image feature value threshold and a defect threshold specifically includes:

identifying and segmenting, according to the set image feature value threshold, a full coverage image of the ceramic ball in a background image by using a threshold segmentation algorithm to obtain a surface image of the identified ceramic ball;

identifying and segmenting a defect of the surface image of the identified ceramic ball by using the threshold segmentation algorithm according to the set defect threshold to obtain an identification result;

when the surface image of the identified ceramic ball indicates a defect, determining the identification result as being that the ceramic ball is defective; and when the surface image of the identified ceramic ball indicates no defect, determining the identification result as being that the ceramic ball is qualified.

Compared with the prior art, the present invention has the beneficial effects that according to the ceramic ball automatic sorting system and method disclosed by the present invention, the system includes a compute, and a ceramic ball feeding track, a robot arm, an image acquisition device, a ceramic ball clamping and overturning device and a ball storage device which are respectively connected with the computer; the computer controls the robot arm to suck a ceramic ball on the ceramic ball feeding track and transfer the ceramic ball to an acquisition area of the image acquisition device for image acquisition, and the acquired image information is sent to the computer in real time, and the computer identifies the ball storage device into which the ceramic ball is placed according to the image information acquired by the image acquisition device, and sends a control command to control the robot arm to place the ceramic ball in the ball storage device to achieve automatic sorting of the ceramic ball. The system automatically sucks the ceramic ball on the ceramic ball feeding track for image acquisition, identifies whether the ceramic ball is defective according to the acquired image information, and determines the ball storage device into which the ceramic ball is placed, and the whole process does not require manual participation, which achieves the automation of ceramic ball defect identification and sorting and improves the ceramic ball defect identification accuracy and sorting efficiency. According to the ceramic ball automatic sorting method disclosed by the present invention, images of the ball surface shot at each angle are automatically spliced by using an automatic image splicing technology to achieve full coverage, a full coverage image of the ceramic ball is identified and segmented from a background image by using a threshold segmentation algorithm. In the identified full coverage image of the ceramic ball, a defect is identified by using the threshold segmentation algorithm according to a set defect threshold, and whether the ceramic ball is defective and the ball storage device where the ceramic ball should be placed are determined, thereby achieving the automation of ceramic ball defect identification and sorting, and improving the ceramic ball defect identification accuracy and sorting efficiency.

BRIEF DESCRIPTION OF THE DRAWINGS

The present invention will be explained in detail with reference to the accompanying drawings.

DETAILED DESCRIPTION OF EMBODIMENTS

Figure 1:
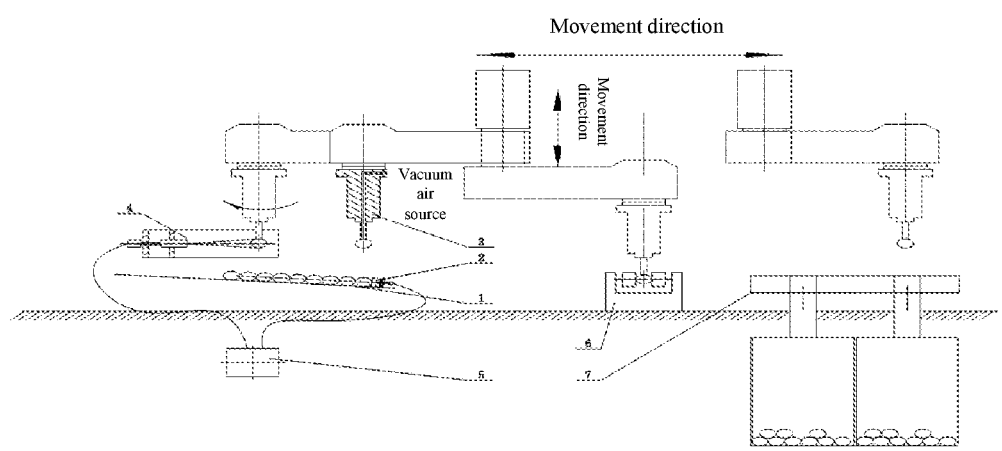
FIG. 1 is a structural view of an embodiment of a ceramic ball automatic sorting system of the present invention.

FIG. 1 is a structural view of an embodiment of a ceramic ball automatic sorting system of the present invention.

Referring to FIG. 1, the ceramic ball automatic sorting system includes a computer 5, and a ceramic ball feeding track 1, a robot arm 3, an image acquisition device 4, a ceramic ball clamping and overturning device 6 and a ball storage device 7 which are respectively connected with the computer 5. The ceramic ball automatic sorting system is fixed on a device platform, and the whole is in a closed positive pressure environment (the device is internally in a positive pressure environment created by compressed air to prevent foreign matter from entering), thereby avoiding interference of external dust and impurities in the detection process.

The ceramic ball feeding track 1 includes a ceramic ball automatic positioning device 2, and the ceramic ball feeding track 1 is connected with the computer 5 through the ceramic ball automatic positioning device 2; the ceramic ball feeding track 1 is inclined, the ceramic ball rolls from a high point to a low point of the inclined ceramic ball feeding track 1, and after the previous ceramic ball is taken away, the next ceramic ball rolls to an end point position of the track under the action of the gravity, where the end point position of the track is the position of the ceramic ball automatic positioning device 2.

The robot arm 3 is composed of a servo motor, a raster line displacement sensor, a single-chip microcomputer control system, a feedback signal processing circuit, and the like, and achieves signal feedback, signal processing, and computing control. The servo motor controls the robot arm 3 to achieve linear displacement motion, the raster line displacement sensor performs positioning, and a specific model of the single-chip microcomputer control system is STC89C54. The robot arm 3 can move left and right, up and down, and rotate by 120 degrees in the axial direction (rotate by 120 degrees in the weft direction). The left-right movement is achieved through the servo motor, and the upper-lower movement is achieved through the cooperation of a motor shaft and a screw hole. The robot arm 3 is connected with a rotating motor, the rotating motor drives the robot arm 3 to rotate axially, and the angle of the axial rotation is in the range of 120 degrees. The robot arm 3 is connected with a vacuum air source. The robot arm 3 sucks the ceramic ball through the connected vacuum air source, the ceramic ball is sucked by negative air pressure, and the ceramic ball and the robot arm are separated by suspending compressed gas, avoiding the damage to the surface of the ceramic ball caused by a mechanical structure. After sorting one ceramic ball, the robot arm 3 directly returns to a fixed initial position to sort the next ceramic ball again.

The image acquisition device 4 includes a pneumatic slider, a camera fixed to the pneumatic slider, a camera position control system connected with the pneumatic slider and a position sensor; and the image acquisition device 4 is connected with the computer 5 through the camera position control system. The camera position control system automatically selects the corresponding sensor position to achieve automatic positioning, automatic focusing, and automatic adjustment of the camera position. The camera is connected to the motor shaft through a threaded hole, and the camera moves back and forth through the rotation of the motor shaft. Different ceramic ball sizes correspond to different shooting positions.

The ball storage device 7 includes a device for storing defective ceramic balls and a device for storing qualified ceramic balls; the device for storing defective ceramic balls and the device for storing qualified ceramic balls are fixed in position, and the computer 5 controls the robot arm 3 to place the ceramic ball in the corresponding ball storage device 7 according to the positions of the device for storing defective ceramic balls and the device for storing qualified ceramic balls.

The computer 5 controls the robot arm 3 to be positioned at a position for sucking a ceramic ball, so as to suck a ceramic ball on the ceramic ball feeding track 1 and transfer the ceramic ball to an acquisition area of the image acquisition device 4 for image acquisition.

The image acquisition device 4 acquires an image of the ceramic ball, and sends the acquired image information to the computer 5 in real time.

The computer 5 controls the robot arm 3 to transfer the ceramic ball to the ceramic ball clamping and overturning device 6 for 90-degree lengthwise overturning, performs image acquisition on the overturned ceramic ball, and sends the acquired image information to the computer 5 in real time.

The computer 5 identifies the ball storage device 7 into which the ceramic ball is placed according to the image information acquired by the image acquisition device 4, and sends a control command to control the robot arm 3 to place the ceramic ball into the ball storage device 7 to achieve automatic sorting of the ceramic ball.

According to the ceramic ball automatic sorting system disclosed by the present invention, the computer controls the robot arm to suck a ceramic ball on the ceramic ball feeding track and transfer the ceramic ball to an acquisition area of the image acquisition device for image acquisition, and the acquired image information is sent to the computer in real time, and the computer identifies the ball storage device into which the ceramic ball is placed according to the image information acquired by the image acquisition device, and sends a control command to control the robot arm to place the ceramic ball in the ball storage device to achieve automatic sorting of the ceramic ball. The ceramic ball automatic sorting system disclosed by the present invention can automatically suck the ceramic ball on the ceramic ball feeding track for image acquisition, identify whether the ceramic ball is defective according to the acquired image information, and determine the ball storage device into which the ceramic ball is placed, and the whole process does not require manual participation, which achieves the automation of ceramic ball defect identification and sorting and improves the ceramic ball defect identification accuracy and sorting efficiency.

Figure 2:
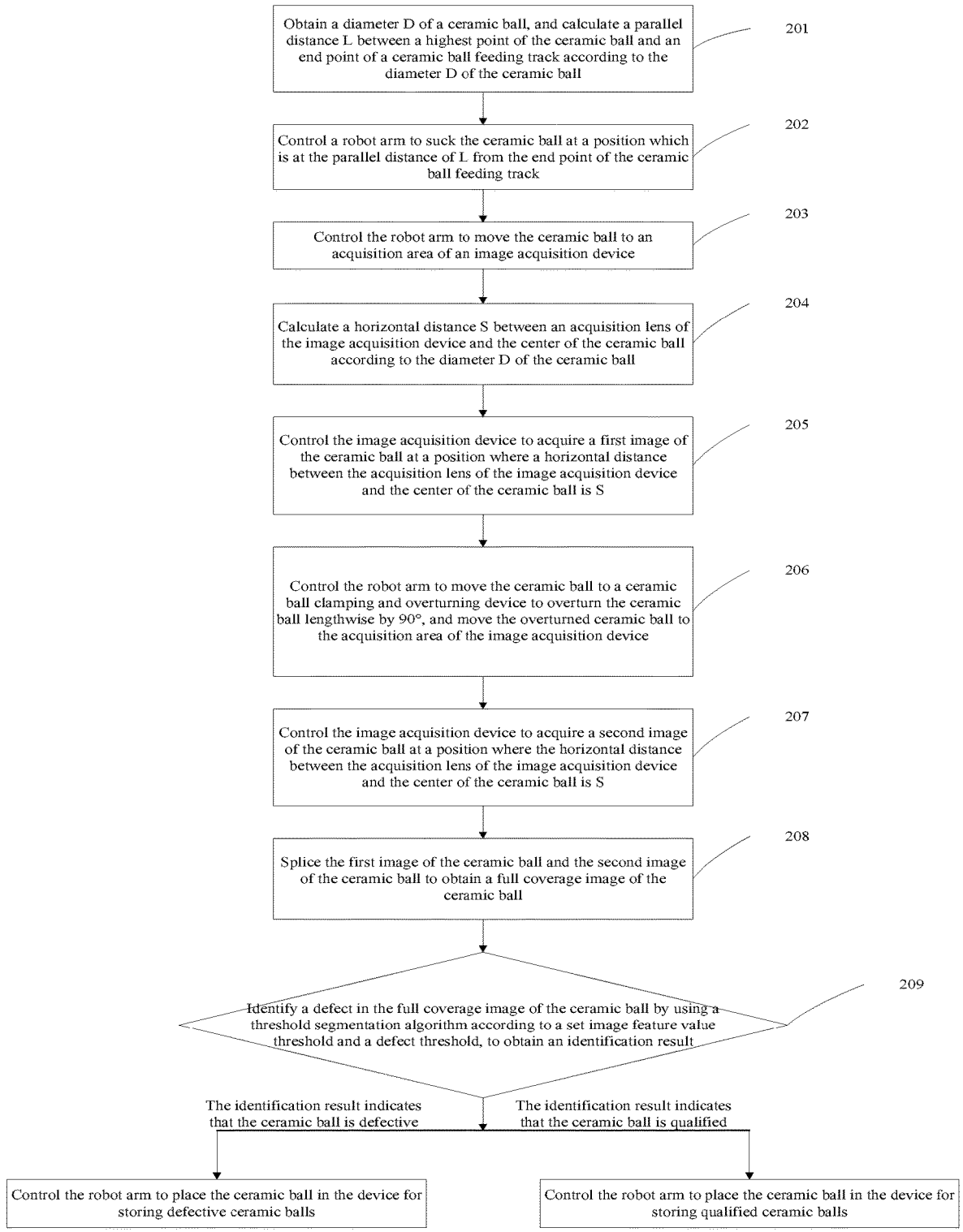
FIG. 2 is a flow chart of an embodiment of a ceramic ball automatic sorting method of the present invention.

FIG. 2 is a flow chart of an embodiment of a ceramic ball automatic sorting method of the present invention.

Referring to FIG. 2, the ceramic ball automatic sorting method includes:

Step 201: obtain a diameter D of a ceramic ball, and calculate a parallel distance L between a highest point of the ceramic ball and an end point of a ceramic ball feeding track according to the diameter D of the ceramic ball.

Figure 3:
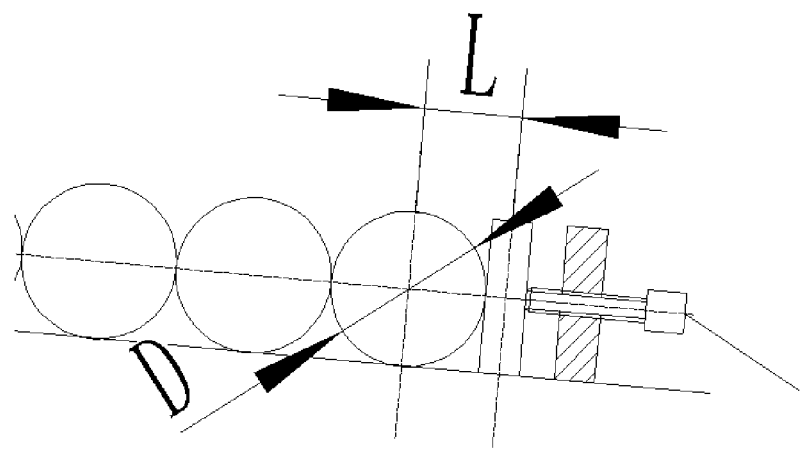
FIG. 3 is a schematic diagram showing the calculation of an L value in an embodiment of a ceramic ball automatic sorting method of the present invention.

Step 201 specifically includes:

calculating a parallel distance L between the highest point of the ceramic ball and the end point of the ceramic ball feeding track according to a formula $L=D/2$. FIG. 3 is a schematic diagram showing the calculation of an L value in an embodiment of a ceramic ball automatic sorting method of the present invention. Referring to FIG. 3, the L value is a horizontal distance between the center of the ceramic ball and the end point of the track (a ceramic ball automatic positioning device). The center of the ceramic ball and the highest point and lowest point of the ceramic ball are located on a line. Therefore, the horizontal distance between the highest point of the ceramic ball and the ceramic ball feeding track is also L, and the L value is ½ of the diameter D of the ceramic ball. Different ceramic ball sizes correspond to different robot arm suction positions, a ceramic ball size that needs to be detected is input into the computer, and the computer performs automatic calculation and performs the suction position positioning; after the L value is input to the single-chip microcomputer control system in the robot arm, the robot arm is positioned through the raster line displacement sensor, achieves linear displacement motion under the action of the servo motor, and is positioned at a position which is at a distance L from the end point of the track to start the suction motion.

Step 202: control a robot arm to suck the ceramic ball at a position which is at the parallel distance of L from the end point of the ceramic ball feeding track.

Step 203: control the robot arm to move the ceramic ball to an acquisition area of an image acquisition device.

Step 204: calculate a horizontal distance S between an acquisition lens of the image acquisition device and the center of the ceramic ball according to the diameter D of the ceramic ball.

Figure 4:
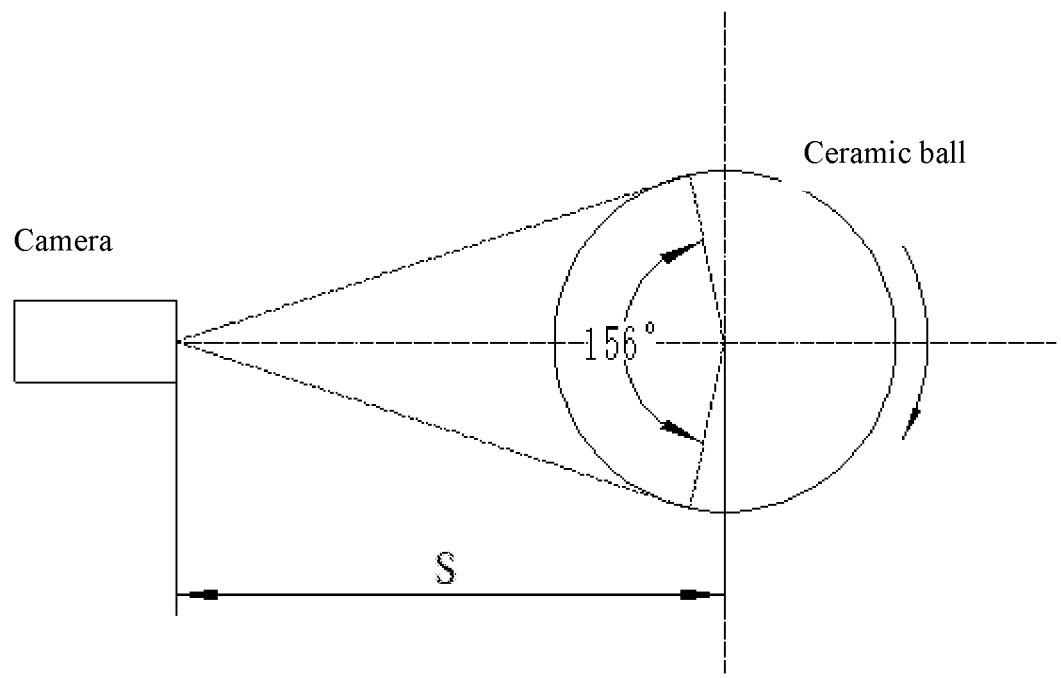
FIG. 4 is a schematic diagram showing the calculation of an S value in an embodiment of a ceramic ball automatic sorting method of the present invention.

Step 204 specifically includes:

calculating the horizontal distance S between the acquisition lens of the image acquisition device and the center of the ceramic ball according to a formula $S=D/2 \sin 12°$. FIG. 4 is a schematic diagram showing the calculation of an S value in an embodiment of a ceramic ball automatic sorting method of the present invention. Referring to FIG. 4, S is the horizontal distance between the center of the ceramic ball and the acquisition lens (camera) of the image acquisition device. After the S value is input to the camera position control system of the image acquisition device, the camera position control system automatically adjusts the distance between the camera and the ceramic ball to achieve automatic adjustment of the camera position and ensure that at least 15% of images shot each time coincide. The image coincidence degree designed in this embodiment is 30%, and S is calculated as: $S=D/2 \sin 12°$, where D is the diameter of the ceramic ball. The S value obtained by the calculation formula is to ensure coincidence of at least 15% of the images shot each time to ensure image splicing, and a full coverage image of the ceramic ball is obtained. The coincidence of at least 15% requires the camera to cover a shooting angle of at least 138°. To ensure a higher coincidence degree of 30%, the camera shooting coverage angle is 156°, then opposite angles are 24°, and the S value is $L=D/2 \sin 12°$.

Step 205: control the image acquisition device to acquire a first image of the ceramic ball at a position where a horizontal distance between the acquisition lens of the image acquisition device and the center of the ceramic ball is S.

Step 206: control the robot arm to move the ceramic ball to a ceramic ball clamping and overturning device to overturn the ceramic ball lengthwise by 90°, and move the overturned ceramic ball to the acquisition area of the image acquisition device.

Step 207: control the image acquisition device to acquire a second image of the ceramic ball at a position where the horizontal distance between the acquisition lens of the image acquisition device and the center of the ceramic ball is S.

Step 208: splice the first image of the ceramic ball and the second image of the ceramic ball to obtain a full coverage image of the ceramic ball.

Step 208 specifically includes:

splicing the first image of the ceramic ball to obtain a spliced first image; where the first image include three images shot by continuously overturning the ceramic ball crosswise by 120° three times;

splicing the second image of the ceramic ball to obtain a spliced second image; where the second image include three images shot by overturning the ceramic ball lengthwise by 90° and then continuously overturning the ceramic ball crosswise by 120° three times; and splicing the spliced first image and the spliced second image to obtain a full coverage image of the ceramic ball.

The splicing is performed using an automatic image splicing technology. By automatically splicing the shot six images, 360-degree full coverage of the ceramic ball surface can be achieved, and a full coverage image of the ceramic ball is obtained. In addition, in order to ensure the splicing accuracy of the image shot 6 times, according to the size of the ceramic ball, the pneumatic slider where the camera is fixed and the position sensor cooperate to control the camera to automatically adjust the distance from the detected ceramic ball, to ensure a coincidence degree of at least 15% of each image.

Step 209: identify a defect in the full coverage image of the ceramic ball by using a threshold segmentation algorithm according to a set image feature value threshold and a defect threshold, to obtain an identification result;

when the identification result indicates that the ceramic ball is defective, control the robot arm to place the ceramic ball in the device for storing defective ceramic balls; and when the identification result indicates that the ceramic ball is qualified, control the robot arm to place the ceramic ball in the device for storing qualified ceramic balls.

Step 209 specifically includes:

identifying and segmenting, according to the set image feature value threshold, a full coverage image of the ceramic ball in a background image by using a threshold segmentation algorithm to obtain a surface image of the identified ceramic ball;

identifying and segmenting a defect of the surface image of the identified ceramic ball by using the threshold segmentation algorithm according to the set defect threshold to obtain an identification result;

when the surface image of the identified ceramic ball indicates a defect, determining the identification result as being that the ceramic ball is defective; and when the surface image of the identified ceramic ball indicates no defect, determining the identification result as being that the ceramic ball is qualified.

The image feature value threshold is used to identify and segment the ball surface image from the background image based on the threshold segmentation algorithm of a regional nature, and the defect threshold is used to segment and identify the ball surface defect from the identified ball surface image based on the threshold segmentation algorithm of the regional nature. When there is a defect on the surface of the ball, the computer distinguishes the defect from the surface background according to the set threshold, thereby identifying the defect. In this embodiment, a silicon nitride ceramic ball is used as a test object, and the set image feature value threshold is generally selected to be about 15, that is, an area where the gray value is greater than or equal to 15 is black, and an area where the gray value is smaller than 15 is white; and the set defect threshold is generally set to 20-30. Since the silicon nitride ceramic ball matrix is dark, and a general defect color is light, an area smaller than a set defect threshold area is a defect area and is displayed as white, and an area greater than or equal to the defect threshold area is a matrix and is still displayed as black. In the actual sorting process, common defects on the surface of the ceramic ball are pits, cracks, scratches, snowflakes, impurities, and the like. When the surface of the ceramic ball is defective, the computer will automatically identify and separate out the defect from the surface background according to the set threshold. The thresholds set for different defects are different, but there are large gray scale differences from the matrix, so manual debugging is needed (enter different thresholds to judge whether the identified defects meet the requirements; if not, continue to adjust the threshold, and the threshold will change according to changes of factors such as site light intensity), finally the most suitable threshold that can identify most of the defects is found, and the threshold can be manually adjusted according to the accuracy requirements to adjust the acceptability of different defects. In addition, the image feature value threshold and the defect threshold may set the threshold or the threshold range. Specifically, whether to set the threshold or the threshold range needs to be determined according to factors such as the on-site lighting environment.

According to the ceramic ball automatic sorting method disclosed by the present invention, images of the ball surface shot at each angle are automatically spliced by using an automatic image splicing technology to achieve full coverage, a full coverage image of the ceramic ball is identified and segmented from a background image by using a threshold segmentation algorithm. In the identified full coverage image of the ceramic ball, a defect is identified by using the threshold segmentation algorithm according to a set defect threshold, and whether the ceramic ball is defective and the ball storage device where the ceramic ball should be placed are determined, thereby achieving the automation of ceramic ball defect identification and sorting, and improving the ceramic ball defect identification accuracy and sorting efficiency.

The ceramic ball automatic sorting method disclosed by the present invention applies an image splicing technology and a threshold technology to the field of ceramic ball detection, which achieves the automation of ceramic ball defect identification and sorting, and improves the ceramic ball defect identification accuracy and sorting efficiency. Through the ceramic ball automatic sorting system, the ceramic ball surface image is automatically acquired and identified based on the automatic image splicing technology and the threshold segmentation algorithm of the computer. According to image features corresponding to different defects of the ceramic ball surface, that is, the degrees of brightness reflected in the image by different defects are different, that is, the gray threshold levels are different, a threshold is first set artificially by utilizing the acquired image; the threshold is determined after a degree at which the defect is identifiable is reached; the acquired ball surface image is processed through the computer by using the set threshold, and the defect is identified from the ceramic ball surface background. Defective balls and qualified balls that are identified are automatically sorted by the computer and placed at different positions, achieving automatic detection of ceramic ball surface defects and the automatic sorting of ceramic balls. This fully automated detection method requiring no artificial participation significantly improves the efficiency of ceramic ball surface quality detection, and ceramic ball surface defect inspection can be accurately and efficiently performed. The adopted ceramic ball automatic sorting system is moderately priced and high in sensitivity and accuracy, and can be used in large quantities for the appearance inspection of the ceramic balls.

In this embodiment, the ceramic ball automatic sorting system can realize automatic defect identification and sorting of φ3-φ10 mm ceramic balls. Silicon nitride ceramic balls of φ3.175 mm-φ9.525 mm are detected by adopting the ceramic ball automatic sorting system, to obtain the following detection results:

| Specification | defect(s) | Total number of defective balls | Checkout number | Detection rate % |
| --- | --- | --- | --- | --- |
| φ3.175 | Pit | 20 | 20 | 100 |
| φ4.763 | Impurity | 20 | 20 | 100 |
| φ7.144 | Snowflake | 20 | 19 | 95 |
| φ7.144 | C-shaped line | 20 | 20 | 100 |
| φ7.144 | Scratch | 20 | 20 | 100 |
| φ7.938 | Pit | 20 | 20 | 100 |
| φ8 | Crack | 20 | 20 | 100 |
| φ9.525 | Pit | 20 | 20 | 100 |
| φ9.525 | Snowflake | 20 | 20 | 100 |

It can be clearly seen from the above detection results that the ceramic ball automatic sorting system and method disclosed by the present invention can accurately detect ceramic balls having various defects, and the detection rate reaches 100%.

The above embodiments are intended to exemplify that the present invention can be implemented or used by those skilled in the art, and it will be apparent to those skilled in the art that the above embodiments can be conventionally modified. Therefore, the present invention includes, but is not limited to, the above embodiments. Any description consistent with the application document, and methods, processes, and products that are identical or similar to the principles disclosed herein shall fall within the protection scope of the present invention.

What is claimed is:

1. A ceramic ball automatic sorting system, comprising a computer, and a ceramic ball feeding track, a robot arm, an image acquisition device, a ceramic ball clamping and overturning device and a ball storage device which are respectively connected with the computer; wherein the computer performs the following steps:

obtaining a diameter D of a ceramic ball, and calculates a parallel distance L between a highest point of the ceramic ball and an end point of a ceramic ball feeding track according to the diameter D of the ceramic ball;

controlling the robot arm to suck the ceramic ball at a position which is at the parallel distance of L from the end point of the ceramic ball feeding track;

controlling the robot arm to move the ceramic ball to an acquisition area of an image acquisition device;

calculating a horizontal distance S between an acquisition lens of the image acquisition device and the center of the ceramic ball according to the diameter D of the ceramic ball;

controlling the image acquisition device to acquire a first image of the ceramic ball at a position where a horizontal distance between the acquisition lens of the image acquisition device and the center of the ceramic ball is S;

controlling the robot arm to move the ceramic ball to a ceramic ball clamping and overturning device to overturn the ceramic ball lengthwise by 90°, and moving the overturned ceramic ball to the acquisition area of the image acquisition device;

controlling the image acquisition device to acquire a second image of the ceramic ball at a position where the horizontal distance between the acquisition lens of the image acquisition device and the center of the ceramic ball is S;

splicing the first image of the ceramic ball and the second image of the ceramic ball to obtain a full coverage image of the ceramic ball;

identifying a defect in the full coverage image of the ceramic ball by using a threshold segmentation algorithm according to a set image feature value threshold and a defect threshold, to obtain an identification result; and when the identification result indicates that the ceramic ball is defective, controlling the robot arm to place the ceramic ball in the device for storing defective ceramic balls; and when the identification result indicates that the ceramic ball is qualified, controlling the robot arm to place the ceramic ball in the device for storing qualified ceramic balls.

2. The ceramic ball automatic sorting system according to claim 1, wherein the ceramic ball feeding track comprises a ceramic ball automatic positioning device, and the ceramic ball feeding track is connected with the computer through the ceramic ball automatic positioning device; and the ceramic ball feeding track is inclined, and the ceramic ball rolls from a high point to a low point of the inclined ceramic ball feeding track.

3. The ceramic ball automatic sorting system according to claim 1, wherein the robot arm is connected with a vacuum air source, and the robot arm sucks the ceramic ball through the connected vacuum air source; the ceramic ball is connected with a rotating motor, the rotating motor drives the robot arm to rotate axially, and the angle of the axial rotation is in the range of 120 degrees.

4. The ceramic ball automatic sorting system according to claim 1, wherein the image acquisition device comprises a pneumatic slider, a camera fixed to the pneumatic slider, a camera position control system connected with the pneumatic slider and a position sensor; and the image acquisition device is connected with the computer through the camera position control system.

5. The ceramic ball automatic sorting system according to claim 1, wherein the ball storage device comprises a device for storing defective ceramic balls and a device for storing qualified ceramic balls; the device for storing defective ceramic balls and the device for storing qualified ceramic balls are fixed in position, and the computer controls the robot arm to place the ceramic ball in the corresponding ball storage device according to the positions of the device for storing defective ceramic balls and the device for storing qualified ceramic balls.

6. The ceramic ball automatic sorting system according to claim 1, wherein the obtaining a diameter D of a ceramic ball, and calculating a parallel distance L between a highest point of the ceramic ball and an end point of a ceramic ball feeding track according to the diameter D of the ceramic ball specifically comprises:

calculating a parallel distance L between the highest point of the ceramic ball and the end point of the ceramic ball feeding track according to a formula $L=D/2$.

7. The ceramic ball automatic sorting system according to claim 1, wherein the calculating a horizontal distance S between an acquisition lens of the image acquisition device and the center of the ceramic ball according to the diameter D of the ceramic ball specifically comprises:

calculating the horizontal distance S between the acquisition lens of the image acquisition device and the center of the ceramic ball according to a formula $S=D/2 \sin 12°$.

8. The ceramic ball automatic sorting system according to claim 1, wherein the splicing the first image of the ceramic ball and the second image of the ceramic ball to obtain a full coverage image of the ceramic ball specifically comprises:

splicing the first image of the ceramic ball to obtain a spliced first image; wherein the first image comprises three images shot by continuously overturning the ceramic ball crosswise by 120° three times;

splicing the second image of the ceramic ball to obtain a spliced second image; wherein the second image comprises three images shot by overturning the ceramic ball lengthwise by 90° and then continuously overturning the ceramic ball crosswise by 120° three times; and splicing the spliced first image and the spliced second image to obtain a full coverage image of the ceramic ball.

9. The ceramic ball automatic sorting system according to claim 1, wherein the identifying a defect in the full coverage image of the ceramic ball by using a threshold segmentation algorithm according to a set image feature value threshold and a defect threshold, to obtain an identification result specifically comprises:

identifying and segmenting, according to the set image feature value threshold, a full coverage image of the ceramic ball in a background image by using a threshold segmentation algorithm to obtain a surface image of the identified ceramic ball;

identifying and segmenting a defect of the surface image of the identified ceramic ball by using the threshold segmentation algorithm according to the set defect threshold to obtain an identification result;

when the surface image of the identified ceramic ball indicates a defect, determining the identification result as being that the ceramic ball is defective; and when the surface image of the identified ceramic ball indicates no defect, determining the identification result as being that the ceramic ball is qualified.

\* \* \* \* \*